UNITED STATES PATENT OFFICE.

JOSEPH WARREN WATTLES, OF CANTON, MASSACHUSETTS.

COMPOSITION FOR SIZING YARN.

SPECIFICATION forming part of Reissued Letters Patent No. 10,532, dated October 14, 1884.

Original No. 292,269, dated January 22, 1884. Application for reissue filed September 17, 1884.

*To all whom it may concern:*

Be it known that I, JOSEPH WARREN WATTLES, of Canton, in the county of Norfolk and State of Massachusetts, have invented a new and useful Improvement in Compounds for Addition to and Improvement of Compounds Used for Sizing Yarns, of which the following is a specification.

My present invention relates especially to improvements in the compositions for such purposes set out and claimed in Letters Patent of the United States granted to me October 5, 1875, No. 168,435, and January 11, 1876, No. 172,216. The active ingredients in those compositions consisted of acetic acid and starch, in one case combined with water as a vehicle, whereby a liquid composition may be produced, while in the other case the starch and acetic acid were so mixed that the starch acted as an absorbent of the acid, leaving the composition dry and in condition to be put up in packages for sale to and use by those having occasion for sizing compounds. I have found that the addition to such a composition of a small percentage of oleaginous matter, or matter of an oily or greasy nature, is an improvement thereto, possessing in use the advantages hereinafter set forth.

My present invention, therefore, is a composition for addition to and improvement of compounds used for sizing yarns, consisting of starch, acetic acid, and an oleaginous material, such as a fat or oil, or matter of a greasy or oily nature. I prefer to use an animal oil or fat; but in some cases a mineral or vegetable oil may be used to advantage.

The composition may be composed of two parts, by weight, of starch, one part, by weight, of acetic acid, and one part, by weight, of the grease, lard, or lard-oil. These are to be heated and thoroughly mixed or combined together, water being used in sufficient quantity when it may be desirable to render the composition sufficiently liquid for use; but the water may be used by the yarn-dresser before using the composition in the dressing-machine.

In practice a small percentage—say one or two—of this composition is added to the sizing as ordinarily made, either fermented or unfermented, so improving the sizing that it is particularly valuable for sizing woolen yarn, though applicable to advantage to other kinds of yarn. The yarn dressed with the sizing improved by the addition of this composition works better in the loom, will not readily mildew, and such dressing is less liable to fermentation than is a dressing of acetic acid and starch alone. It can be used in a wet or damp state, and when dry will not easily separate from the yarn.

In practice this special composition is to be put up as an article of manufacture for addition to and improvement of the sizing ordinarily made at the place of consumption. When so added to such sizing, it is evident that the result is a sizing or dressing compound having a starch base improved by acetic acid and oleaginous matter.

I do not intend to confine my yarn dressing or sizing composition to the precise proportions of its ingredients as hereinbefore stated, for such may be somewhat varied without materially affecting the character or utility of the composition.

I do not herein claim a yarn-dressing consisting of starch and acetic acid, or such and water, having claimed such in liquid and dry states in the aforementioned patents.

I claim—

1. A composition for addition to and improvement of ordinary yarn sizings or dressings, substantially as described, composed of acetic acid, starch, and grease or oil, mixed or combined essentially as set forth.

2. An improved sizing or yarn-dressing compound, consisting of a starch base improved by the addition thereto of acetic acid and oleaginous matter, substantially as set forth.

This specification signed and witnessed this 26th day of August, 1884.

JOSEPH WARREN WATTLES.

Witnesses:

N. W. DUNBAR,

WALTER AMES.